United States Patent
Maucher et al.

(10) Patent No.: US 7,445,099 B2
(45) Date of Patent: Nov. 4, 2008

(54) TORQUE TRANSMISSION DEVICE

(75) Inventors: Edmund Maucher, Wooster, OH (US); William Brees, Norton, OH (US)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 347 days.

(21) Appl. No.: 10/519,391

(22) PCT Filed: Jun. 25, 2003

(86) PCT No.: PCT/DE03/02113

§ 371 (c)(1),
(2), (4) Date: Dec. 12, 2005

(87) PCT Pub. No.: WO2004/003400

PCT Pub. Date: Jan. 8, 2004

(65) Prior Publication Data

US 2006/0086584 A1     Apr. 27, 2006

(30) Foreign Application Priority Data

Jun. 27, 2002  (DE) .................................. 102 28 712

(51) Int. Cl.
*F16H 45/02*      (2006.01)

(52) U.S. Cl. ........................ 192/3.26; 192/3.27; 192/3.29
(58) Field of Classification Search ................ 192/3.25, 192/3.26, 3.27
See application file for complete search history.

(56) References Cited

U.S. PATENT DOCUMENTS 6,494,303 B1 *  12/2002  Reik et al. ................. 192/3.29

FOREIGN PATENT DOCUMENTS

| CH | 312037 | 2/1956 |
|---|---|---|
| DE | 891 502 | 9/1953 |
| DE | 2 245 901 | 4/1974 |
| DE | 39 17 986 | 8/1990 |
| DE | 10024191 A1 * | 11/2000 |

* cited by examiner

*Primary Examiner*—Rodney H Bonck
(74) *Attorney, Agent, or Firm*—Davidson, Davidson & Kappel, LLC

(57) ABSTRACT

A torque transmission device includes a torque converter, a pump impeller, a turbine wheel and optionally a stator. The device also includes a converter bypass coupling having a flange which is connected to the housing or the pump impeller in a force-locking manner. The flange is arranged between the pump impeller and the turbine wheel and can be connected to the turbine wheel in a frictionally engaged manner by means of a first coupling.

17 Claims, 1 Drawing Sheet

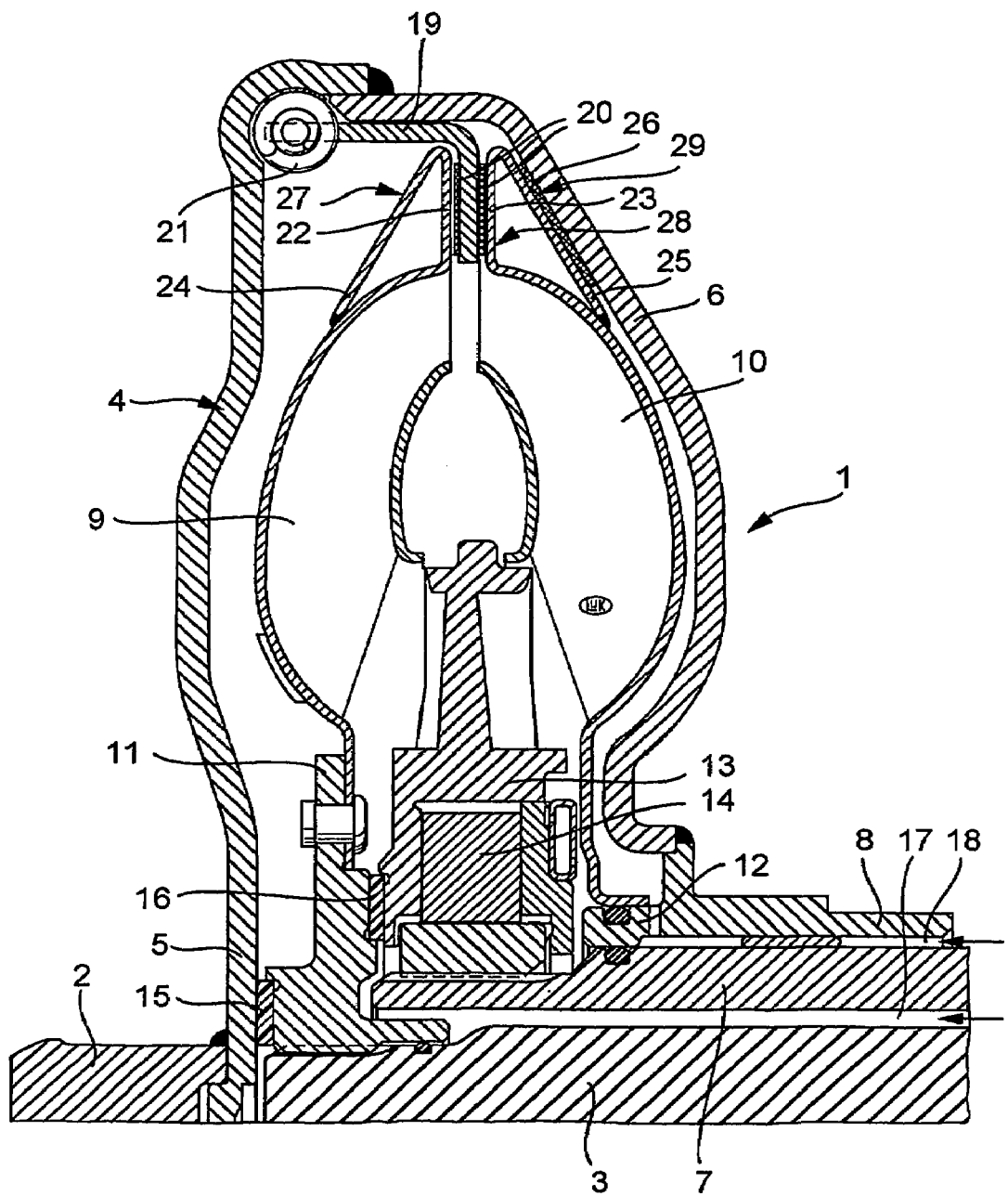

TORQUE TRANSMISSION DEVICE

BACKGROUND

The present invention is directed to a torque transmission device, in particular for a motor vehicle, having a fluid coupling, such as a Föstinger coupling, or a torque converter, having at least one impeller that is connectable in a torsion ally fixed manner to a drive shaft of a drive unit, at least one turbine that is connectable in a torsion ally fixed manner to the input shaft of a drive train to be driven, as well as, optionally, at least one stator mounted between the impeller and turbine, at least one housing that accommodates the impeller and the turbine, as well as a converter lockup clutch, which is able to lock together the impeller and turbine in a torsion ally fixed manner.

SUMMARY OF THE INVENTION

Torque transmission devices of this kind are known in particular for fixed-ratio automatic transmissions. An object of the present invention is to improve the damping action of devices of this kind, the intention being for the rotational inertia and weight to correspond to those of related-art torque transmission devices, and for the dimensions, in particular the axial length, not to be increased in comparison to related-art torque transmission devices.

The present invention provides a torque transmission device in which the converter lockup clutch includes a flange that is connected by force-locking to the housing or the impeller, that is mounted between the impeller and the turbine, and that is connectable in a frictionally engaged manner by a coupling to the turbine. A connection is understood here to be both a direct connection as well as a connection that is produced, for example, via other, in particular, resilient elements. In this context, the other elements may be rigid or flexible. The flange may preferably be designed to be continuous, however a discontinuous flange is also conceivable. The flange is positioned in the axial direction between the turbine and the impeller. The possibility of having a frictionally engaged connection between the flange and the turbine means that, in a first operating position, both are substantially locked together in a torsion ally fixed manner, up to a limiting torque; in a second position, both are able to rotate freely relative to each other.

Another embodiment of the torque transmission device provides for the flange to be mounted on a tensional vibration damper that is coupled to the housing. The tensional vibration damper allows the flange to move against a spring force relative to the housing.

One preferred specific embodiment of the torque transmission device provides for it to also include a third switchable coupling, which may be used to uncouple the impeller from the input shaft, given a disengaged third coupling, the impeller being able to rotate relative to the input shaft. The third switchable coupling is preferably disposed between the impeller and the housing.

Another embodiment of the torque transmission device provides for it to include a second switchable coupling which enables the impeller to be locked together with the flange in a torsion ally fixed manner. In this manner, the impeller may be connected to the housing against the spring action of the damping device.

With the aid of the third coupling, it is possible to completely disconnect the impeller from the input shaft and, in this way, achieve a type of freewheeling state. In the standstill state, in particular, it is undesirable for a drag torque to be transmitted to the transmission, since this results in an avoidable thermal loading of the torque transmission device and, in comparison to a free idling of the engine, leads to an increased fuel consumption. With the aid of the second and third coupling, the impeller may be optionally connected to the input shaft in a torsion ally fixed manner or be connected to the input shaft via the vibration damper in a manner that permits rotation against a spring force.

Another embodiment of the torque transmission device provides for the flange to be able to be optionally coupled to the impeller and/or the turbine in a torsion ally fixed manner. With the aid of the first, second and third coupling described above, various operating states are able to be implemented in this manner. When all of the couplings are disengaged, consequently the flange is neither coupled in a frictionally engaged manner to the impeller nor to the turbine, and, at the same time, the third coupling is disengaged, then the torque transmission device is in a freewheeling state. For that reason, except for drag torques between the housing and the other devices, there is virtually no transmission of torque. At the least, any torque transmission is substantially less than in torque converter operation. In the case of an engaged third coupling, a torque converter operation takes place. If the first and second coupling are engaged, the third coupling, on the other hand, disengaged, then a lock-up operation follows, thus the turbine and impeller are locked together in a torsion ally fixed manner, both being driven via the vibration damper. The housing, on the one hand, and the turbine/impeller combination, on the other hand, form systems which are able to rotate relative to other, against the spring force of the vibration damper, the vibration behavior of the overall system being determined by the rotational inertias of the two mentioned subsystems, as well as by the damping and spring actions of the vibration damper, in particular.

The vibration damper is preferably accommodated within the housing.

One preferred specific embodiment of the torque transmission device according to the present invention provides for the impeller and/or the turbine to be axially displaceable within the housing. The axial displace ability of the turbine renders possible the first coupling; the axial displace ability of the impeller renders possible the second and third coupling.

Preferably, the first and/or second and/or third coupling are friction clutches. In addition, the friction clutches each include friction linings.

The first and/or second and/or third coupling may preferably be disengaged and engaged by axial displacement of the impeller and/or of the turbine.

It is preferably provided for the axial displacement of the turbine to take place hydraulically. It may also be provided for the axial displacement of the impeller to take place hydraulically. To that end, the torque transmission device includes a first pressure channel and a second pressure channel, which enable pressure to be applied axially to the turbine and the impeller. In this context, the turbine and impeller are mounted in a way that permits a fluid to stream through the entire torque transmission device; in other words, the first pressure channel is pressurized, for example, with the result that the entire torque transmission device is traversed by flow, hydraulic fluid flowing in through the first pressure channel and flowing out through the second pressure channel.

It is preferably provided for the first, second and third coupling to be disengaged when the first and second pressure channel are at approximately the same pressure. This may mean that the pressure prevailing in both pressure channels is approximately equal to zero. However, the pressure may also be at a different level. Because all of the couplings are disengaged, the torque transmission device is in a freewheeling state.

It is preferably provided for the third coupling to be engaged and the first and second coupling to be disengaged when the pressure prevailing in the first pressure channel is higher than the pressure prevailing in the second pressure channel.

It is preferably provided for the third coupling to be disengaged and the first and second coupling to be engaged when the pressure prevailing in the second pressure channel is higher than the pressure prevailing in the first pressure channel. The measures described above render possible three switching states of the couplings within the torque transmission device. In this manner, a freewheeling state, a torque converter operation, as well as a lock-up of the torque converter operation may be achieved.

BRIEF DESCRIPTION OF THE DRAWING

An exemplary embodiment is described in the following with reference to the enclosed drawing, in which:

The figure shows a torque transmission device according to the present invention in a sectional view.

DETAILED DESCRIPTION

A torque transmission device 1 includes a drive shaft 2, which is connected to a crankshaft (not shown) of a combustion engine in a motor vehicle, as well as an input shaft 3, which is connected to the automatic gearshift unit (likewise not shown). In addition, torque transmission device 1 includes a housing 4 made up of a first housing part 5, as well as a second housing part 6. First housing part 5, as well as second housing part 6 are imperviously welded together at their periphery, for example. Torque transmission device 1 is rotatable mounted on a shaft end 7 of the transmission (not shown). With the aid of a sealing nose 8, as well as sealing means (not shown), torque transmission device 1 is supported in a rotatable, but oil-tight manner on the transmission housing (not shown).

A turbine 9, as well as an impeller 10 are mounted inside housing 4. By way of a hub flange 11, turbine 9 is connected in a torsion ally fixed, but axially displaceable manner to drive shaft 3. Impeller 10 is mounted so as to be axially displaceable, as well as rotatable on a bearing projection 12 of housing 4. Between impeller 10 and turbine 9, a generally known stator 13 is supported by a freewheel 14 on transmission shaft end 7 in such a way that it is torsion ally fixed in one direction and rotatable in the other direction. Stator 13 is likewise displaceable in the axial direction. A first stop ring 15 provides for an axial bracing up of turbine 9 against housing 4. Correspondingly, a second stop ring 16 provides for an axial bracing of stator 13 against turbine 9.

Torque transmission device 1 has a first pressure channel 17, as well as a second pressure channel 18. Hydraulic oil may then be directed through the system via the pressure channels.

A tensional vibration damper 21 is positioned inside the periphery of first housing part 5. It is preferably formed from bow springs nested in one another, two of the bow springs distributed over the circumference and extending approximately over half of the circumference preferably forming the energy storage that is effective in the circumferential direction. In this context, the bow springs are acted upon at one peripheral end by active loading devices (not shown in greater detail), which are joined to first housing part 5 or are formed from it, and, at the other end, by an axially extended piece of a flange 19. In other words, flange 19 is rotatable against the force of the bow springs relative to first housing part 5. Flange 19 is designed to be continuous inside of housing 4 and is provided with friction linings 20 on both sides.

Turbine 9 has a friction surface 22, which forms a continuous, axial annular surface. Correspondingly, impeller 10 has a second friction surface 23, first friction surface 22 and second friction surface 23 together being able to grip around flange 19. The radially running surface of flange 19, as well as first friction surface 22 and second friction surface 23 are substantially aligned in parallel with one another. In the present exemplary embodiment, first friction surface 22 and second friction surface 23 are braced by a first supporting flank 24 and a second supporting flank 25 against turbine 9 and impeller 10, respectively, so that both are only slightly deformed in the axial direction in response to an axially applied load.

Second supporting flank 25 is provided on the side facing second housing part 6 with a third friction lining 26. Together with flange 19 and associated friction lining 20, first friction surface 22 forms a first coupling 27; correspondingly, together with flange 19 and associated friction lining 20, second friction surface 23 forms a second coupling 28; together with second housing part 6, third friction lining 26 forms a third coupling 29.

The various modes of operation of the torque transmission device according to the present invention are described in the following. In this context, the distinction is made among a freewheeling operation, a torque converter operation, as well as a lock-up operation.

The various modes of operation may be carried out by a pressurization of first pressure channel 17 and of second pressure channel 18. If first pressure channel 17 and second pressure channel 18 are pressurized with the same pressure or are kept in an unpressurized state, then first, second, and third coupling 27, 28, 29 are all disengaged. As a result, with the aid of freewheel 14, impeller 10 is free-wheeling. Consequently, no torque is transmitted, and the torque transmission device is in the freewheeling state.

In response to a pressurization of first pressure channel 17, the entire torque transmission device is traversed by flow, second pressure channel 18 functioning as outflow for the operating medium. In response to pressurization of first pressure channel 17, impeller 10 in the representation according to the figure is pressed to the right; as a result third coupling 29 is engaged, and impeller 10 is connected in a torsion ally fixed manner to second housing part 6 and thus to housing 4. First coupling 27, as well as second coupling 28 are disengaged, so that turbine 9 is able to rotate freely relative to impeller 10 and housing 4. For that reason, as is the case when working with torque converters or Föstinger couplings, it is customary for turbine 9 to be driven solely by the fluid flow produced by the relative motion of turbine 9 with respect to impeller 10. In this operating mode, the torque transmission device is in torque converter operation.

If second pressure channel 18 is pressurized, so that the torque transmission device is traversed by flow from second pressure channel 18 as inflow and from first pressure channel 17 as outflow into the operating medium, then impeller 10 in the representation according to the figure is pressed to the left, so that third coupling 29 is disengaged and second coupling 28 is engaged. Thus, impeller 10 is connected via flange 19 and consequently via tensional vibration damper 21 to housing 4. At the same time, in the representation according to the figure, turbine 9 is pressed to the right, so that first coupling 27 is likewise engaged. Thus, turbine 9, as well as impeller 10 grip around flange 19 and, as a result, are rotationally fixed to one another. Flange 19 is connected, in turn, by way of tensional vibration damper 21 to housing 4, so that here as well, a connection that is substantially stiff, though slightly rotatable in response to spring force, is produced between impeller 10 and turbine 9, as well as housing 4. Thus, the function of the torque transmission device as torque converter is by-passed in this case; the torque transmission device is in lock-up operation. Thus, together, first and second coupling 27, 28 form the lockup clutch.

In torque converter operation, impeller 10, along with the corresponding bearing parts, as well as housing 4 form a unit which is rotatable relative to turbine 9 having the corresponding bearing parts and input shaft 3. Both subsystems are substantially rigid and only coupled to one another via the hydraulic oil. For that reason, the vibration behavior of the overall system is determined by the particular rotational inertias of the individual systems, and the coupling by the fluid. In lock-up operation, turbine 9, as well as impeller 10, along with the corresponding bearing parts and output shaft 3, as well as flange 19, are substantially rigidly interconnected and form one combined rotationally inert system. This system is rotatable connected against spring force by way of tensional vibration damper 21 to housing 4. On the whole, therefore, a system is created that is capable of damped tensional vibrations, whose characteristic vibration properties are determined from the ratio of the masses of the previously described subsystems, and the rigidity of the spring coupling is determined by the tensional vibration damper.

The claims filed with the application are proposed formulations and do not prejudice the attainment of further patent protection. The applicant reserves the right to claim still other combinations of features that, so far, have only been disclosed in the specification and/or the drawings.

The antecedents used in the dependent claims refer, by the features of the respective dependent claim, to a further embodiment of the subject matter of the main claim; they are not to be understood as renouncing attainment of an independent protection of subject matter for the combinations of features of the dependent claims having the main claim as antecedent reference.

Since, in view of the related art on the priority date, the subject matters of the dependent claims may form separate and independent inventions, the applicant reserves the right to make them the subject matter of independent claims or of divisional applications. In addition, they may also include independent inventions, whose creation is independent of the subject matters of the preceding dependent claims.

The exemplary embodiments are not to be understood as limiting the scope of the invention. Rather, within the framework of the present disclosure, numerous revisions and modifications are possible, in particular such variants, elements and combinations and/or materials, which, for example, by combining or altering individual features or elements or method steps described in connection with the general description and specific embodiments, as well as the claims, and contained in the drawings, may be inferred by one skilled in the art with regard to achieving the objective, and lead, through combinable features, to a new subject matter or to new method steps or sequences of method steps, also to the extent that they relate to manufacturing, testing, and operating methods.

What is claimed is:

1. A torque transmission device for a motor vehicle, the torque transmission device being a fluid coupling device being one of a Föttinger device and a torque converter, comprising:
    an impeller connectable in a torsionally fixed manner to a drive shaft;
    a turbine connectable in a torsionally fixed manner to an input shaft;
    a housing accommodating the impeller and the turbine;
    a converter lockup clutch configured to lock together the impeller and the turbine in a torsionally fixed manner;
    a flange disposed axially between the impeller and the turbine and connected in a force-locking manner to at least one of the housing and the impeller, the flange also being radially disposed outside of a radially outer end of the impeller and the turbine; and
    a first coupling configured to connect the flange in a frictionally engaged manner to the turbine.

2. The torque transmission device as recited in claim 1, further comprising a stator disposed between the impeller and turbine.

3. The torque transmission device as recited in claim 1, further comprising a torsional vibration damper coupled to the housing and wherein the flange is mounted on the torsional vibration damper.

4. The torque transmission device as recited in claim 3, wherein the torsional vibration damper is disposed within the housing.

5. The torque transmission device as recited in claim 1, further comprising a third switchable coupling configured to uncouple the impeller from the input shaft, wherein the impeller is rotatable relative to the input shaft in a disengaged state of the third coupling.

6. The torque transmission device as recited in claim 5, further comprising a second switchable coupling configured to lock the impeller together with the flange in a torsionally fixed manner.

7. The torque transmission device as recited in claim 6, wherein at least one of the first, second and third couplings is a friction clutch.

8. The torque transmission device as recited in 7, wherein the friction clutch includes a friction lining.

9. The torque transmission device as recited in claim 6, wherein at least one of the first, second and third couplings may be disengaged and engaged by an axial displacement of at least one of the impeller and the turbine.

10. The torque transmission device as recited in claim 9, wherein the axial displacement is performed hydraulically.

11. The torque transmission device as recited in claim 9, further comprising a first pressure channel and a second pressure channel.

12. The torque transmission device as recited in claim 11, wherein the first, second and third couplings are disengaged when the first and second pressure channels are at approximately the same pressure.

13. The torque transmission device as recited in claim 11, wherein the third coupling is engaged, and the first and second coupling are disengaged when the pressure prevailing in the first pressure channel is higher than the pressure prevailing in the second pressure channel.

14. The torque transmission device as recited in claim 11, wherein the third coupling is disengaged, and the first and second coupling are engaged when the pressure prevailing in the second pressure channel is higher than the pressure prevailing in the first pressure channel.

15. The torque transmission device as recited in claim 5, wherein the third switchable coupling acts between the impeller and the housing.

16. The torque transmission device as recited in claim 1, wherein the flange is selectively coupleable to at least one of the impeller and the turbine in a torsionally fixed manner.

17. The torque transmission device as recited in claim 1, wherein at least one of the impeller and the turbine are axially displaceable within the housing.

* * * * *